United States Patent [19]
Miller

[11] 3,968,937
[45] July 13, 1976

[54] DROPPING DISPOSING

[76] Inventor: Gaylord R. Miller, 6561 Hawaii Kai Drive, Honolulu, Hawaii 96825

[22] Filed: Apr. 19, 1974

[21] Appl. No.: 462,503

[52] U.S. Cl. .................................. 241/5; 111/7.1; 241/39
[51] Int. Cl.² ........................................ B02C 19/12
[58] Field of Search ............ 401/289; 239/104, 251, 239/273, 275, 285, 288.3, 287; 111/6, 7.1, 7.4; 241/5, 39

[56] References Cited
UNITED STATES PATENTS

| | | | |
|---|---|---|---|
| 2,841,923 | 7/1958 | Dickison | 239/104 X |
| 2,878,633 | 3/1959 | Mullin | 239/104 X |
| 3,464,629 | 9/1969 | Peters | 239/104 |
| 3,680,504 | 8/1972 | Seebald | 111/6 |
| 3,753,408 | 8/1973 | Zimmerman | 111/7.1 |
| 3,817,194 | 6/1974 | Seebald | 111/7.1 |
| 3,832,069 | 8/1974 | Petsch | 401/289 |

Primary Examiner—Granville Y. Custer, Jr.
Attorney, Agent, or Firm—James C. Wray

[57] ABSTRACT

Droppings are disposed by placing a rotating sprinkler within a container over droppings and dissolving the droppings, lifting the open-bottom container from the droppings, and flowing the solution or dispersion outward. A valve actuates the sprinkler once the open-bottom container has been placed over the dropping. A ballast tank fills with water to hold the container down on droppings when disposing of droppings which are resistant to solution or dispersion.

10 Claims, 5 Drawing Figures

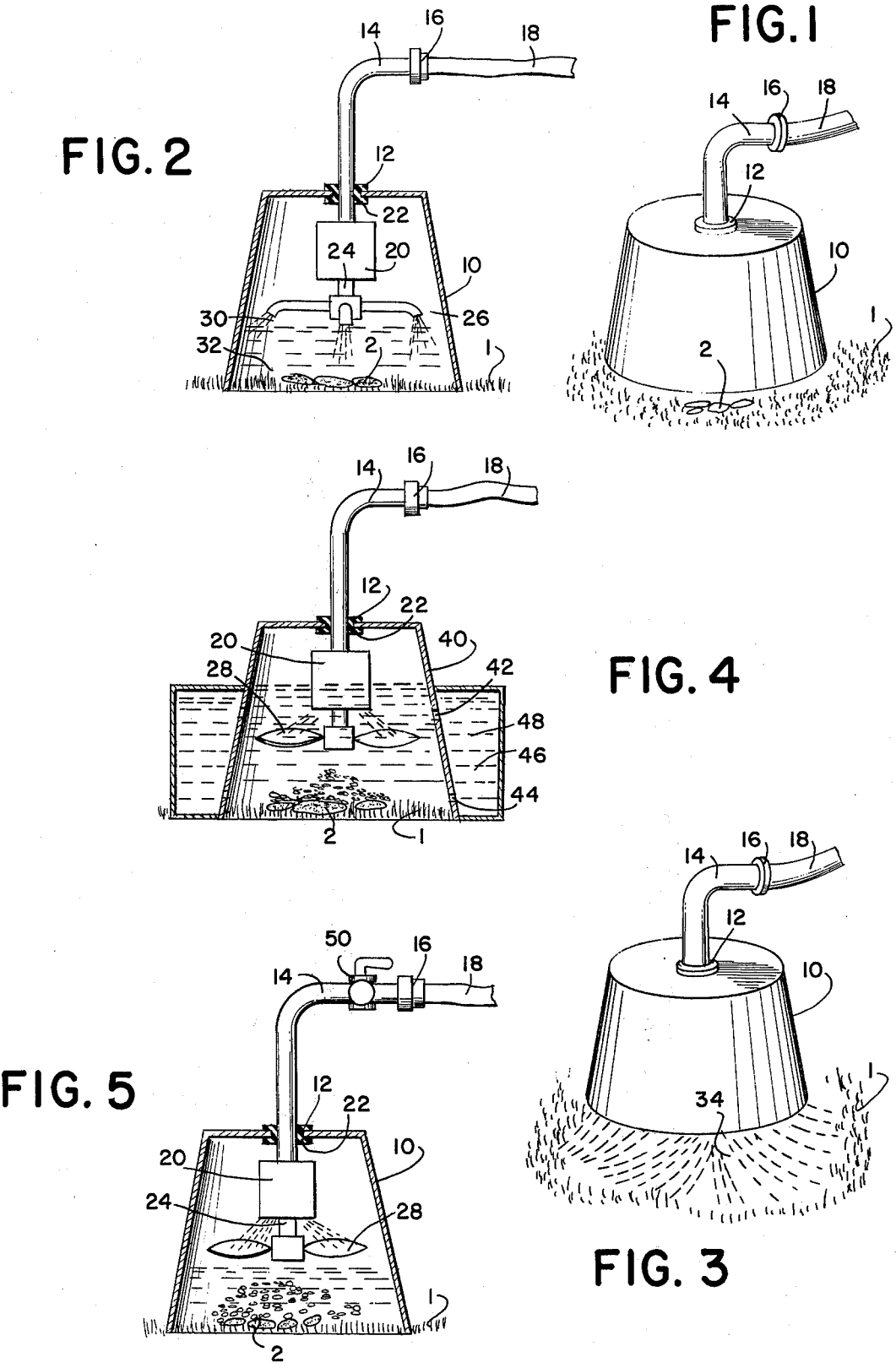

DROPPING DISPOSING

BACKGROUND OF THE INVENTION

Animal droppings, particularly dog droppings have long been a bane to the existence of home owners and lawn maintenance personnel. Disposing of the droppings is one of the most distasteful tasks which has to be undertaken in the maintenance and grooming of a lawn. Heretofore, the task has required the lifting of the dropping by a scraping apparatus and the burying of the dropping if a suitable place can be found, or the depositing of the droppings into a small bacterial digestion chamber, or the collecting of the dropping in some air tight container for further disposition. All of these methods and apparatus are difficult and time consuming, and must be conducted in an environment and situation which is extremely displeasing.

Heretofore, no method and apparatus have been provided to satisfactorily dipose of droppings while maintaining benefits of the well known organic materials and nitrogen compounds useful as fertilizers from the droppings. No methods have been known to satisfactorily fluidize the dropping with equipment intended primarily for that purpose.

PRIOR ART

Prior to preparing an application for patent, the applicant had conducted in his behalf a search of disclosures in the United States Patent Office files.

Examples of the closest patents that were found are: U.S. Patents No. 3,748,050 and 3,464,629.

Neither of these patents suggests the present invention.

Patent 3,464,629 was selected for its showing of spraying within a circular enclosure. However, the purpose and the effect of that weed eradicating spray greatly differ from those of the present invention.

U.S. Pat. No. 3,748,050 was selected to show rotary spraying within a circular enclosure. The purpose of the device is to scrub and clean a surface.

SUMMARY OF THE INVENTION

Briefly, the disposer is a rotating sprinkler head mounted inside an inverted bucket or drum so that the bottom is open. The disposer is placed over a dog dropping, and water is turned on. The expelled water breaks up the dropping and fluidizes it. When the water is turned off and the bucket lifted, the fluidized material flows into the ground.

In one modification, a valve is provided adjacent the bucket. In another modification, a supplemental water tank surrounds the bucket to fill with water and to aid in holding the bucket down when the device is used to break up and fluidize an old, dry dropping.

Broad objectives of the invention are accomplished by placing a downward opening chamber on a ground over and around a dropping to be dispersed, and by directing water in the enclosure to break-up, solubilize, dissolve or disperse the dropping, and by removing the enclosure to flow the fluidized material outward.

In a preferred embodiment, the enclosure has side walls and an upper wall connected to the side walls for sealing the enclosure to prevent all but downward water egress.

A preferred enclosure is constructed similar to an inverted bucket with a central opening for mounting a water directing means within the bucket.

A preferred form of water directing means is a rotating spraying device. The rotating device may spray water on the ground surrounding the droppings to tend to lift droppings from the ground, and may spray water directly on the droppings to aid in breaking up the droppings, or may swirl water around within the enclosure to promote circulation in the area of the dropping. The spraying device may be submerged within water within the enclosure to aid in stirring, or may actually contact the droppings to further aid in the fluidizing process.

In a preferred form, a valve is provided in the water supply line directly adjacent the enclosure or slightly above the enclosure, so that the enclosure may be placed around a dropping before water is turned on, and so that the water may be turned off before the enclosure is removed from the dropping to prevent outward flinging and deflecting of the sprayed water.

In a preferred form of the invention, the water supply line is a rigid line which extends upward from a mounting on the upper surface of the enclosure, and the rigid supply line is configured, for example, by bending to form a handle so that one need not stoop to place the disposer over a dropping.

In one form of the invention a ballast is provided to be attached to the enclosure for holding the enclosure down and around a dropping for fluidizing resistant droppings, such as aged or dried or surface hardened droppings. The ballast is permanently attached to a disposer enclosure chamber, or is detachable. Preferably, the ballast surrounds the chamber externally. The ballast may be formed in an annular ring to fit over a downward and outward sloped chamber wall. However, in a preferred embodiment, a ballast tank is permanently attached externally to the chamber wall, and the wall is provided with orifices for flowing water into and out of the ballast tank, so that water builds up within the ballast tank at the same time that it builds up within the chamber. The ballast tank then provides the necessary downward force to hold the otherwise opened bottom chamber downward against the ground to insure water retention within the chamber and to prevent migration of the chamber away from the area of the droppings to be dispersed.

One object of the invention is to provide dropping disposer apparatus comprising a chamber having a downward opening for positioning on ground around a dropping to be disposed, a mounting means connected to the chamber for mounting a water supply, and a water supply means connected to the mounting means for supplying water to the chamber, directing means connected to the water supply means for directing water from the supply means inwardly within the chamber for breaking up dropping materials.

Another object of the invention is to provide such a chamber with side walls extending upward and a top wall covering the side walls and secured thereto, and with the mounting means connected to the top wall and comprising in part an opening in the top wall for permitting passage of the water supply means.

A further object of the invention is to provide such dropping disposer apparatus wherein the directing means comprises spinning delivery means connected to the water supply for spinning water within the chamber.

This invention has as another object of the provision of such apparatus wherein the directing means comprises a turning sprinkler means having a plurality of orifices for flowing water into the chamber.

Another object of the invention is the provision of a dropping disposer chamber apparatus comprising a valve connected to a supply for turning on the supply and admitting water to directing means when a chamber is placed around a dropping to be dispersed.

Another object of the invention is the provision of ballast means connected to a chamber for holding the chamber downward around a dropping to be fluidized.

Further objects of the invention are to provide dropping disposers wherein ballasts are mounted externally on a side walls of chambers, wherein the ballasts comprise tanks connected to the chambers, and wherein the tanks and side walls have water flow openings for flowing water between the chambers and the tanks.

This invention has as a further object the provision of a method for disposing of droppings comprising placing chambers over the droppings and flowing water into the chambers, fluidizing the droppings, dissolving the droppings, and lifting the chambers from the droppings and flowing the dissolved droppings and water from the chambers, and dispersing the droppings.

A further object of the invention is the provision of the step of turning water on after chambers have been placed over the dropping, and turning water off after the droppings have been fluidized.

Further objects of the invention are the providing of methods for fluidizing dog droppings as previously set forth wherein the placing of chambers over droppings comprises enclosing the droppings in chambers having a side walls joined to top walls, wherein the flowing water into the chambers comprises flowing water out of rotating sprinkler devices in the chambers, and flowing water from the chambers into ballast tanks and holding water within the ballast tanks and the chambers while dissolving the droppings.

These and other objects and features of the invention are apparent in the disclosure which includes the foregoing and ongoing specification, with the claims, and the drawings.

BRIEF DESCRIPTION OF THE DRAWING

FIG. 1 is a view showing the placing of the chamber over a dropping on a lawn.

FIG. 2 is a side elevation of the device with the chamber shown in cross section to reveal the internal rotating sprinkler.

FIG. 3 is a view of the step of lifting the chamber from the ground and flowing the fluidized and dissolved material outward for dispersion in the ground.

FIG. 4 is a partially cross-sectional elevation of a modification of the invention having a ballast for holding the chamber down.

FIG. 5 is a detail of a modification of the invention having a valve in the water supply adjacent the chamber.

DETAILED DESCRIPTION OF THE DRAWINGS

Referring to FIG. 1, the invention is used to disperse droppings 2 into surrounding ground 1. The steps of the invention are accomplished by placing a chamber 10 over and around dropping 2, and by flowing water into the chamber to contact the dropping with the water. In the embodiment shown in the drawings, the chamber 10 has a mounting means 12 on its top for holding a water supply means 14.

As shown in FIG. 2, the water supply means is preferably constructed of a rigid pipe or tube being configured in such a way near its upper end as to provide a handle for lifting and moving the chamber 10 between locations. In this case, water supply 14 is bent near its upper end to form a cane-like handle. The female coupling 16 of hose 18 is connected to a male coupling on the distal end of water supply 14.

The mounting means 12 includes a hole which passes through the upper wall of chamber 10 and blocks, clamps or packing-type coupling which firmly hold the water supply pipe 14 in the opening to form a rigid structure. In one form, the mounting may comprise a coupling element 22 connected to the lower assembly, and a complementary lower assembly and a complementary coupling element 12 connected to supply 14 so that the lower element may be disconnected from the water supply 14 to disassemble the apparatus.

In a preferred embodiment, a swivel connection 20 is mounted within chamber 10 so that pipe 24 freely turns within the swivel. Pipe 24 delivers water to deflectors 26 which spray water in at least a partially tangential direction to promote reactive turning of the arms 26.

The sprayed water may be directed toward the dropping so that it physically aids the break up of the dropping, or the water may be flung toward the walls of the chamber 10, or flowed directly toward the grass surrounding the dropping to promote lifting of the dropping to aid in its fluidization. The water spray 30 preferably results in some build up of water 32 to aid in the fluidization of the dropping 2.

When the dropping is fluidized to a desired extent, chamber 10 is lifted as shown in FIG. 3, and the water solution and fluidized dropping flow outward as indicated at 34.

As described, the spray may contact the dropping or may stir the water to aid in fluidization. The arms 26 may spin in the water to stir the water or the arms may be positioned close to the ground to contact the dropping to further aid in its physical disintegration. For that purpose, mounting device 12 may be constructed as a threaded locking sleeve which may be loosened so that pipe 14 may be moved downward before the sleeve 12 is tightened to a lock supply 13 in the new position.

Preferably the mounting means 12 and the side walls and top wall are joined in continuous seals so that no water escapes upward.

In FIG. 4 a modified form of sprinkler is shown. Streams of water are broken into pulsating flung droplets by sprinkling propeller blades 28.

With reference to FIG. 4, a modified chamber 40 is shown. Side walls of chamber 40 have apertures 42 and 44 which permit flow of water from chamber 40 into ballast tank 46. The build up of water 48 within annular ballast tank 46 weights chamber 40 and holds the chamber down on the ground while water is built up and circulated in the chamber for a time sufficient to fluidize resistant droppings.

Weep holes may be provided near the bottom of chamber 46 to completely drain the chamber when the device is not in use.

One or more holes may be communicated between the chamber 40 and the ballast 46, but preferably upper and lower arrays of holes are used to insure free flow of water into and out of the ballast tank 46 without causing positive or negative pressures which would tend to restrict flow.

In the preferred embodiment of the invention as shown in FIG. 5, a valve 50 is provided in the water supply close to the chamber and in the handle portion of the water supply so that the water may be turned on after the chamber is placed over a dropping and before the chamber is removed from the dropping. Slight downward pressure upon the handle may be useful while the water is on to facilitate the complete fulidizing of particular droppings.

Although the invention has been described with reference to specific embodiment, it will be obvious to those skilled in the art, that modifications and variations may be constructed without departing from the spirit and scope of the invention. The scope of the invention is defined in the following claims.

I claim:

1. Dropping disposer apparatus comprising a chamber having side wall and upper wall means for retaining water and having a downwared opening for positioning on ground around a dropping to be disposed, a mounting means connected to the chamber for mounting a wate supply, and a water supply means connected to the mounting means for supplying water to at least partially fill the chamber, spinning delivery means connected to the water supply means for spinning water from the supply means inwardly within the chamber for solubilizing dropping materials, and ballast tank means mounted on a wall of the chamber for holding the chamber downward around the dropping to be disposed and water flow openings in the wall of the chamber for flowing water between the chamber and the tank.

2. The dropping disposer apparatus of claim 1 wherein the chamber has side walls extending upward and a top wall covering the side walls and secured thereto, and wherein the mounting means is connected to the top wall and comprises an opening in the top wall for permitting passage of the water supply means.

3. The dropping disposer of claim 1, wherein the ballast means is externally mounted on a side wall of the chamber.

4. The dropping disposer apparatus of claim 1 wherein the ballast means comprises a tank formed on the outside of the chamber, and wherein the chamber and tank have a common intermediate wall, and further comprising water flow openings mounted in the common wall of the chamber and tank for flowing water between the chamber and tank.

5. The apparatus of claim 1 wherein the spinning delivery means comprises a swivel mounted within the chamber, a plurality of arms connected to the swivel and connected to the water supply, and openings at angles in the ends of the arms for releasing water and for driving the arms in an opposite direction to the releasing of water.

6. The apparatus of claim 5 wherein the arms are positioned substantially downward from an upper wall of the container.

7. The method of disposing of droppings comprising placing a chamber over the droppings and spinning water into the chamber; solubilizing the droppings, dissolving the droppings, flowing water from the chamber into a ballast tank and holding water within the ballast tank and the chamber while dissolving the dropping, and lifting the chamber from the droppings and flowing the dissolved droppings and water from the chamber, and dispersing the solution.

8. The method of claim 7 wherein the flowing step further comprises flowing water from the chamber into a ballast tank immediately surrounding the chamber through holes in a lower portion of a wall of the chamber.

9. The method of claim 8 wherein the flowing step comprises flowing water through holes in a common outer wall of the chamber and inner wall of the ballast tank.

10. The method of claim 7 wherein the spinning step comprises releasing water at an angle from end of rotating arms, and rotating the arms by reaction of the water releasing.

* * * * *